United States Patent
Bittner et al.

(10) Patent No.: US 9,145,509 B2
(45) Date of Patent: Sep. 29, 2015

(54) PROCESS FOR PRODUCING MINERAL OIL USING SURFACTANTS BASED ON A MIXTURE OF C32 GUERBET-, C34 GUERBET-, C36 GUERBET-CONTAINING ALKYL ALKOXYLATES

(75) Inventors: Christian Bittner, Bensheim (DE); Günter Oetter, Frankenthal (DE); Jack Tinsley, Mannheim (DE); Christian Spindler, Ludwigshafen (DE); Gabriela Alvarez Jürgenson, Mannheim (DE); Sophie Vogel, Mannheim (DE); Petra Neumann, Böhl-Iggelheim (DE); Veronika Wloka, Mannheim (DE); Martin Bock, Hannover (DE)

(73) Assignee: BASF SE, Ludwigshafen (DE)

( * ) Notice: Subject to any disclaimer, the term of this patent is extended or adjusted under 35 U.S.C. 154(b) by 1081 days.

(21) Appl. No.: 13/091,677

(22) Filed: Apr. 21, 2011

(65) Prior Publication Data

US 2011/0263467 A1   Oct. 27, 2011

Related U.S. Application Data

(60) Provisional application No. 61/327,118, filed on Apr. 23, 2010.

(30) Foreign Application Priority Data

Apr. 23, 2010 (EP) ..................................... 10160888

(51) Int. Cl.
   *C09K 8/584* (2006.01)
(52) U.S. Cl.
   CPC ..................................... *C09K 8/584* (2013.01)
(58) Field of Classification Search
   CPC ..................................................... C09K 8/584
   See application file for complete search history.

(56) References Cited

U.S. PATENT DOCUMENTS

| | | | |
|---|---|---|---|
| 3,119,880 A | 1/1964 | Kollar et al. | |
| 3,558,716 A | 1/1971 | Engelhardt et al. | |
| 3,864,407 A | 2/1975 | Yates | |
| 3,979,466 A | 9/1976 | Yates | |
| 4,545,912 A | 10/1985 | Schmitt | |
| 5,741,947 A | 4/1998 | Wolf et al. | |
| 6,342,473 B1 * | 1/2002 | Kott et al. | 510/357 |
| 7,119,125 B1 * | 10/2006 | O'Lenick et al. | 516/25 |
| 7,335,235 B2 * | 2/2008 | Ruland et al. | 8/137 |
| 2008/0194435 A1 | 8/2008 | Huff et al. | |
| 2008/0217064 A1 | 9/2008 | Stoian et al. | |
| 2009/0270281 A1 | 10/2009 | Steinbrenner et al. | |

FOREIGN PATENT DOCUMENTS

| | | |
|---|---|---|
| DE | 3901095 A1 | 7/1990 |
| DE | 4325237 A1 | 2/1995 |
| DE | 10243361 A1 | 4/2004 |
| WO | WO-2006/131541 A1 | 12/2006 |

OTHER PUBLICATIONS

U.S. Appl. No. 13/426,305, Mar. 21, 2012, Bittner et al.
U.S. Appl. No. 12/903,441, Oct. 13, 2010, Bittner et al.
U.S. Appl. No. 12/903,654, Oct. 13, 2010, Bittner et al.
U.S. Appl. No. 12/903,762, Oct. 13, 2010, Bittner et al.
U.S. Appl. No. 12/950,646, Nov. 19, 2010, Steiner et al.
U.S. Appl. No. 13/044,345, Mar. 9, 2011, Bittner et al.
U.S. Appl. No. 13/043,210, Mar. 8, 2011, Bittner et al.
U.S. Appl. No. 13/044,283, Mar. 9, 2011, Bittner et al.
U.S. Appl. No. 13/085,248, Mar. 9, 2011.
U.S. Appl. No. 13/111,298, May 19, 2011, Bittner et al.
U.S. Appl. No. 13/093,356, Apr. 25, 2011, Bittner et al.
U.S. Appl. No. 61/251,310, Oct. 14, 2009, Bittner et al.
U.S. Appl. No. 61/251,314, Oct. 14, 2009, Bittner et al.
U.S. Appl. No. 61/251,315, Oct. 14, 2009, Bittner et al.
U.S. Appl. No. 61/312,292.
U.S. Appl. No. 61/312,294.
U.S. Appl. No. 61/312,299.
U.S. Appl. No. 61/312,302.
U.S. Appl. No. 61/315,051.
U.S. Appl. No. 61/325,051.
U.S. Appl. No. 61/327,118, Apr. 23, 2010, Bittner et al.
U.S. Appl. No. 61/327,124.
U.S. Appl. No. 61/394,369.
G. Casiraghi, G. Casnati and M. Cornia, Tetrahedron Letters, No. 9, 679-682 (1973).
M. B. Dinger and M. J. Scott describe in Chem. Commun., 1999, 2525/2526.
M. B. Dinger and M. J. Scott, Inorg. Chem. 2000, 39, 1238-1254.
M. B. Dinger and M. J. Scott , Inorg. Chem. 2001, 40, 1029-1036.
M. B. Dinger and M. J. Scott, Eur J. Org. Chem. 2000, 2467-2478.
K. Matloka, A. Gelis, M. Regalbuto, G. Vandegift and M. J. Scott, Dalton Trans., 2005, 3719-3721.
K. Matloka, A. Gelis, M. Regalbuto, G. Vandegift and M. J. Scott , Separation Science and Technology, 41, 2006, 2129-2146.
M. W. Peters, E. J. Werner and M. J. Scott, Inorg. Chem., 2002, 41, 1701-1716.
R. Mitra, M.W. Peters and M. Scott, Dalton Trans., 2007, 3924-3935.
H. Hoffmann et al., Adv. Colloid Interface Sci. 1982, 17, 275-298.
M. R. Rojas et al., Journal of Colloid and Interface Science 342 (2010) 103-109.
Versteeg et al. Chemosphere 24 (1992) 641-662.

* cited by examiner

*Primary Examiner* — Randy Gulakowski
*Assistant Examiner* — Jeffrey Washville
(74) *Attorney, Agent, or Firm* — Drinker Biddle & Reath LLP

(57) ABSTRACT

The present invention relates to a process for mineral oil extraction by means of Winsor type III microemulsion flooding, in which an aqueous surfactant formulation comprising at least three ionic surfactants which are different with regard to the alkyl moiety $(R^1)(R^2)$—CH—CH$_2$— and are of the general formula $(R^1)(R^2)$—CH—CH$_2$—O-(D)$_n$-(B)$_m$-(A)$_l$-XY$^{a-}$a/bM$^{b+}$ is injected through injection boreholes into a mineral oil deposit, and crude oil is withdrawn from the deposit through production boreholes. The invention further relates to surfactant formulations of ionic surfactants of the general formula.

13 Claims, No Drawings

PROCESS FOR PRODUCING MINERAL OIL USING SURFACTANTS BASED ON A MIXTURE OF C32 GUERBET-, C34 GUERBET-, C36 GUERBET-CONTAINING ALKYL ALKOXYLATES

CROSS-REFERENCE TO RELATED APPLICATIONS

This Application claims the benefit of U.S. Provisional Application 61/327,118, filed Apr. 23, 2010 and European Application 10160888.3, filed Apr. 23, 2010.

FIELD OF THE INVENTION

The present invention relates to a process for mineral oil production by means of Winsor type III microemulsion flooding, in which an aqueous surfactant formulation comprising at least three ionic surfactants which are different with regard to the alkyl moiety $(R^1)(R^2)$—CH—CH$_2$ and are of the general formula

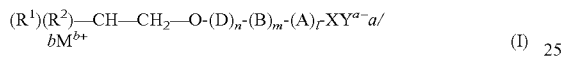
(I)

is injected through injection boreholes into a mineral oil deposit, and crude oil is withdrawn from the deposit through production boreholes. The invention further relates to surfactant formulations comprising three ionic surfactants which are different with regard to the alkyl moiety $(R^1)(R^2)$—CH—CH$_2$ and are of the general formula (I), and to processes for preparation of this surfactant mixture.

BACKGROUND

In natural mineral oil deposits, mineral oil is present in the cavities of porous reservoir rocks which are sealed toward the surface of the earth by impervious top layers. The cavities may be very fine cavities, capillaries, pores or the like. Fine pore necks may, for example, have a diameter of only about 1 μm. As well as mineral oil, including fractions of natural gas, a deposit comprises water with a greater or lesser salt content.

In mineral oil production, a distinction is generally drawn between primary, secondary and tertiary production. In primary production, the mineral oil flows, after commencement of drilling of the deposit, of its own accord through the borehole to the surface owing to the autogenous pressure of the deposit.

After primary production, secondary production is therefore used. In secondary production, in addition to the boreholes which serve for the production of the mineral oil, the so-called production bores, further boreholes are drilled into the mineral oil-bearing formation. Water is injected into the deposit through these so-called injection bores in order to maintain the pressure or to increase it again. As a result of the injection of the water, the mineral oil is forced slowly through the cavities into the formation, proceeding from the injection bore in the direction of the production bore. However, this only works for as long as the cavities are completely filled with oil and the more viscous oil is pushed onward by the water. As soon as the mobile water breaks through cavities, it flows on the path of least resistance from this time, i.e. through the channel formed, and no longer pushes the oil onward.

By means of primary and secondary production, generally only approx. 30 to 35% of the amount of mineral oil present in the deposit can be produced.

It is known that the mineral oil yield can be enhanced further by measures for tertiary oil production. A review of tertiary oil production can be found, for example, in "Journal of Petroleum Science of Engineering 19 (1998)", pages 265 to 280. Tertiary oil production includes, for example, thermal methods in which hot water or steam is injected into the deposit. This lowers the viscosity of the oil. The flow medium used may likewise be gases such as $CO_2$ or nitrogen.

Tertiary mineral oil production also includes methods in which suitable chemicals are used as assistants for oil production. These can be used to influence the situation toward the end of the water flow and as a result also to produce mineral oil hitherto held firmly within the rock formation.

Viscous and capillary forces act on the mineral oil which is trapped in the pores of the deposit rock toward the end of the secondary production, the ratio of these two forces relative to one another being determined by the microscopic oil separation. By means of a dimensionless parameter, the so-called capillary number, the action of these forces is described. It is the ratio of the viscosity forces (velocity x viscosity of the forcing phase) to the capillary forces (interfacial tension between oil and water x wetting of the rock):

$$N_c = \frac{\mu v}{\sigma \cos\theta}.$$

In this formula, μ is the viscosity of the fluid mobilizing mineral oil, v is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillary number toward the end of secondary mineral oil production is in the region of about $10^{-6}$ and that it is necessary to increase the capillary number to about $10^{-3}$ to $10^{-2}$ in order to be able to mobilize additional mineral oil.

For this purpose, it is possible to conduct a particular form of the flooding method—what is known as Winsor type III microemulsion flooding. In Winsor type III microemulsion flooding, the injected surfactants should form a Winsor type III microemulsion with the water phase and oil phase present in the deposit. A Winsor type III microemulsion is not an emulsion with particularly small droplets, but rather a thermodynamically stable, liquid mixture of water, oil and surfactants. The three advantages thereof are that
 a very low interfacial tension a between mineral oil and aqueous phase is thus achieved,
 it generally has a very low viscosity and as a result is not trapped in a porous matrix,
 it forms with even the smallest energy inputs and can remain stable over an infinitely long period (conventional emulsions, in contrast, require high shear forces which predominantly do not occur in the reservoir, and are merely kinetically stabilized).

The Winsor type III microemulsion is in an equilibrium with excess water and excess oil. Under these conditions of microemulsion formation, the surfactants cover the oil-water interface and lower the interfacial tension a more preferably to values of $<10^{-2}$ mN/m (ultra-low interfacial tension). In order to achieve an optimal result, the proportion of the microemulsion in the water-microemulsion-oil system, with a defined amount of surfactant, should by its nature be at a maximum, since this allows lower interfacial tensions to be achieved.

In this manner, it is possible to alter the form of the oil droplets (interfacial tension between oil and water is lowered to such a degree that the smallest interface state is no longer favored and the spherical form is no longer preferred), and they can be forced through the capillary openings by the flooding water.

When all oil-water interfaces are covered with surfactant, in the presence of an excess amount of surfactant, the Winsor type III microemulsion forms. It thus constitutes a reservoir for surfactants which cause a very low interfacial tension between oil phase and water phase. By virtue of the Winsor type III microemulsion being of low viscosity, it also migrates through the porous deposit rock in the flooding process (emulsions, in contrast, can become trapped in the porous matrix and block deposits). When the Winsor type III microemulsion meets an oil-water interface as yet uncovered with surfactant, the surfactant from the microemulsion can significantly lower the interfacial tension of this new interface, and lead to mobilization of the oil (for example by deformation of the oil droplets).

The oil droplets can subsequently combine to a continuous oil bank. This has two advantages:

Firstly, as the continuous oil bank advances through new porous rock, the oil droplets present there can coalesce with the bank.

Moreover, the combination of the oil droplets to give an oil bank significantly reduces the oil-water interface and hence surfactant no longer required is released again. Thereafter, the surfactant released, as described above, can mobilize oil droplets remaining in the formation.

Winsor type III microemulsion flooding is consequently an exceptionally efficient process, and requires much less surfactant compared to an emulsion flooding process. In microemulsion flooding, the surfactants are typically optionally injected together with co-solvents and/or basic salts (optionally in the presence of chelating agents). Subsequently, a solution of thickened polymer is injected for mobility control. A further variant is the injection of a mixture of thickening polymer and surfactants, co-solvents and/or basic salts (optionally with chelating agent), and then a solution of thickening polymer for mobility control. These solutions should generally be clear in order to prevent blockages of the reservoir.

The requirements on surfactants for tertiary mineral oil production differ significantly from requirements on surfactants for other applications: suitable surfactants for tertiary oil production should reduce the interfacial tension between water and oil (typically approx. 20 mN/m) to particularly low values of less than $10^{-2}$ mN/m in order to enable sufficient mobilization of the mineral oil. This has to be done at the customary deposit temperatures of approx. 15° C. to 130° C. and in the presence of water of high salt contents, more particularly also in the presence of high proportions of calcium and/or magnesium ions; the surfactants thus also have to be soluble in deposit water with a high salt content.

To fulfill these requirements, there have already been frequent proposals of mixtures of surfactants, especially mixtures of anionic and nonionic surfactants.

U.S. Pat. No. 7,119,125 B1 describes a mixture of sulfated Guerbet alcohol alkoxylate and of low molecular weight sulfated alkyl alkoxylate in oil production. Particularly good emulsifying properties are attributed to the bimodal distribution. However, these emulsifying properties are of no great importance in Winsor type III microemulsion flooding. Too much surfactant would be required for the emulsification of oil, and the shear forces required are barely present in the flooding operation (apart from the region around the injector).

US-A 2008/217064 describes a drilling fluid solution comprising a nonionic surfactant—consisting of at least one branched alkyl ethoxylate and an end group-capped alkyl ethoxylate—and also a detergent builder and a viscosifier. The nonionic surfactant may be a C10 Guerbet alcohol ethoxylate.

US-A 2009/270281 describes the use of a surfactant mixture for mineral oil production, which comprises at least one surfactant having an alkyl radical of 12 to 30 carbon atoms and a branched cosurfactant having an alkyl radical of 6 to 11 carbon atoms. The degree of branching of the alkyl radical in the cosurfactant ranges from 1 to 2.5, and can thus comprise Guerbet alcohols of the 2-ethylhexyl or 2-propylheptyl type. The cosurfactants may be alcohol ethoxylates or anionically modified alcohol ethoxylates (e.g. alkyl ether sulfate).

The use parameters, for example type, concentration and mixing ratio of the surfactants used with respect to one another, are therefore adjusted by the person skilled in the art according to the conditions existing in a given oil formation (for example temperature and salt content).

As described above, mineral oil production is proportional to the capillary number. The lower the interfacial tension between oil and water, the higher it is. The higher the mean number of carbon atoms in the crude oil, the more difficult it is to achieve low interfacial tension. Suitable surfactants for low interfacial tensions are those which possess a long alkyl radical. The longer the alkyl radical, the better it is possible to reduce the interfacial tensions. However, the availability of such compounds is very limited.

BRIEF SUMMARY

It is therefore an object of the invention to provide a particularly efficient surfactant and an efficient surfactant mixture for use for surfactant flooding, and an improved process for tertiary mineral oil production. It is a further object of the invention to provide a process for preparing these surfactants or surfactant mixture.

Accordingly, a mixture of at least 3 different ionic surfactants with regard to the alkyl moiety $(R^1)(R^2)$—CH—$CH_2$—, and a process, are provided for tertiary mineral oil production by means of Winsor type III microemulsion flooding, in which an aqueous surfactant formulation comprising at least 3 surfactants which are different with regard to the alkyl moiety $(R^1)(R^2)$—CH—$CH_2$— is injected through at least one injection borehole into a mineral oil deposit, the interfacial tension between oil and water is lowered to values of <0.1 mN/m, preferably to values of <0.05 mN/m, more preferably to values of <0.01 mN/m, and crude oil is withdrawn from the deposit through at least one production borehole, wherein the surfactant formulation comprises at least 3 surfactants which are different with regard to the alkyl moiety $(R^1)(R^2)$—CH—$CH_2$— and are of the general formula (I)

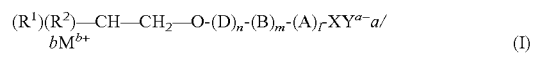
(I)

where
- $R^1$ is a linear or branched, saturated or unsaturated, aliphatic hydrocarbyl radical having 14 to 16 carbon atoms,
- $R^2$ is a linear or branched, saturated or unsaturated, aliphatic hydrocarbyl radical having 16 to 18 carbon atoms,
- A is ethyleneoxy, B is propyleneoxy,
D is butyleneoxy,
l is from 0 to 99,
m is from 0 to 99,
n is from 0 to 99,
X is an alkyl or alkylene group having 0 to 10 carbon atoms,
$M^{b+}$ is a cation,
$Y^{a-}$ is selected from the group of sulfate groups, sulfonate groups, carboxylate groups and phosphate groups,
b is 1, 2 or 3,
a is 1 or 2,
where the A, B and D groups may be distributed randomly, alternatingly, or in the form of two, three, four or more blocks in any sequence and the sum of l+m+n is in the range from 0 to 99.

In a preferred embodiment,
$R^1$ is a linear or branched, saturated or unsaturated, aliphatic hydrocarbyl radical having 14 or 16 carbon atoms,
$R^2$ is a linear or branched, saturated or unsaturated, aliphatic hydrocarbyl radical having 16 or 18 carbon atoms.

In a particularly preferred embodiment,
$R^1$ is a linear saturated or unsaturated (preferably saturated), aliphatic hydrocarbyl radical having 14 or 16 carbon atoms,
$R^2$ is a linear saturated or unsaturated (preferably saturated), aliphatic hydrocarbyl radical having 16 or 18 carbon atoms, and
as a result at least 3 ionic surfactants of the general formula (I) with an alkyl radical having 32 carbon atoms, 34 carbon atoms and 36 carbon atoms are present. When the sum of these three surfactants is formed, the $C_{32}$ surfactant of the (I) type is present within a range from 20% to 40%, the $C_{34}$ surfactant of the (I) type within a range from 41% to 60% and the $C_{36}$ surfactant of the (I) type within a range from 10% to 35%.

In a preferred embodiment, the invention or the use relates to a surfactant mixture comprising at least 3 surfactants of the general formula (I), where the sum of l+m+n is in each case in the range from 4 to 50.

In a further preferred embodiment, the invention relates to a mixture of three ionic surfactants with regard to the alkyl moiety $(R^1)(R^2)$—CH—CH$_2$—, and to the use thereof, where m is from 4 to 15, n is from 0 to 15 and $Y^{a-}$ is selected from the group of sulfate groups, sulfonate groups and carboxylate groups, where the A, B and D groups are present to an extent of more than 80% in block form in the sequence D, B, A beginning from $(R^1)(R^2)$—CH—CH$_2$, the sum of l+m+n is in the range from 5 to 49.

A particularly preferred embodiment is when n is from 2 to 15, m is from 5 to 9, and $Y^{a-}$ is selected from the group of sulfate groups, sulfonate groups and carboxylate groups, where the A and B groups are present to an extent of more than 80% in block form in the sequence D, B, A commencing from $(R^1)(R^2)$—CH—CH$_2$, the sum of l+m+n is in the range from 4 to 50, and the D block consists to an extent of more than 80% of 1,2-butylene oxide.

DETAILED DESCRIPTION OF THE PREFERRED EMBODIMENTS

In a preferred embodiment of the invention, a surfactant formulation is provided, which consists of three surfactants which are different with regard to the alkyl moiety $(R^1)(R^2)$—CH—CH$_2$— and are of the general formula (I) in a mixture with surfactants of the formula (II)

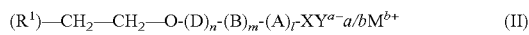

$(R^1)$—CH$_2$—CH$_2$—O-(D)$_n$-(B)$_m$-(A)$_l$-XY$^{a-}$a/bM$^{b+}$    (II)

and surfactants of the formula (III)

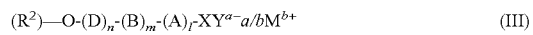

$(R^2)$—O-(D)$_n$-(B)$_m$-(A)$_l$-XY$^{a-}$a/bM$^{b+}$    (III)

where $R^1$, $R^2$, X, a, b, $Y^{a-}$ and $M^{b+}$ are each as defined above for the general formula (I) and the surfactants of the formula (I) make up between preferably 80 and 99% by weight and more preferably 85-99% by weight of the amount of compounds of the formulae (I), (II) and (III).

In a particularly preferred embodiment of the invention, in the general formula (II), $R^1$ is a linear saturated, aliphatic hydrocarbyl radical having 14 or 16 carbon atoms and, in the general formula (III), $R^2$ is a linear saturated, aliphatic hydrocarbyl radical having 16 or 18 carbon atoms.

With regard to the invention, the following should be stated specifically:

In the above-described process according to the invention for mineral oil production by means of Winsor type III microemulsion flooding, an aqueous surfactant formulation comprising three surfactants which are different with regard to the alkyl moiety $(R^1)(R^2)$—CH—CH$_2$— and are of the general formula (I) is used. It may additionally comprise further surfactants and/or other components.

In the process according to the invention for tertiary mineral oil production by means of Winsor type III microemulsion flooding, the use of the inventive surfactant mixture lowers the interfacial tension between oil and water to values of <0.1 mN/m, preferably to <0.05 mN/m, more preferably to <0.01 mN/m. The interfacial tension between oil and water is thus lowered to values in the range from 0.1 mN/m to 0.0001 mN/m, preferably to values in the range from 0.05 mN/m to 0.0001 mN/m, more preferably to values in the range from 0.01 mN/m to 0.0001 mN/m.

The three surfactants which are different with regard to the alkyl moiety $(R^1)(R^2)$—CH—CH$_2$— can be encompassed by the general formula $(R^1)(R^2)$—CH—CH$_2$—O-(D)$_n$-(B)$_m$-(A)$_l$-XY$^{a-}$ a/b $M^{b+}$. The difference can arise through the number of carbon atoms, the number of unsaturated bonds, the branching frequency and/or the degree of branching. More particularly, the surfactants differ in the chain length given for $R^1$ and $R^2$. By way of example, $R^1/R^2$ are alkyl chains having 14/16, 14/17, 14/18, 15/16, 15/17, 15/18, 16/16, 16/17, 16/18—especially 14/16, 14/18, 16/16, 16/18—carbon atoms. As a result of production, it is also possible for more than three different surfactants of the general formula to be present in the surfactant formulation. Preferably, the three surfactants form the main components of the surfactant mixture. The proportion thereof is preferably at least 25% by weight based on the total weight of the surfactant mixture, more preferably at least 30% by weight, more preferably at least 40% by weight, more preferably at least 50% by weight.

The $R^1$ radical is a linear or branched, saturated or unsaturated, aliphatic hydrocarbyl radical having 14 to 16 carbon atoms. The $R^2$ radical is a linear or branched, saturated or unsaturated, aliphatic hydrocarbyl radical having 16 to 18 carbon atoms. $R^1$ is either identical to $R^2$ or has a maximum of two carbon atoms more than $R^2$.

In the case of branched $R^1$ and $R^2$ radicals, the degree of branching in $R^1$ or $R^2$ is in the range of 0.1-5 (preferably of 0.1-1.5). For the branched aliphatic hydrocarbyl radical $(R^1)(R^2)$—CH—CH$_2$, this gives a degree of branching of 1.2 to 11 (preferably 1.2 to 4).

The term "degree of branching" is defined here in a manner known in principle as the number of methyl groups in a molecule of the alcohol minus 1. The mean degree of branching is the statistical mean of the degrees of branching of all molecules in a sample.

A preferred embodiment, however, is the use of linear, saturated or unsaturated $R^1$ radicals having 14 or 16 carbon atoms or $R^2$ radicals having 16 or 18 carbon atoms. Particular preference is given to the use of linear saturated $R^1$ and $R^2$ radicals. For the aliphatic hydrocarbyl radical $(R^1)(R^2)$—CH—CH$_2$, this gives a degree of branching of 1.

In the above formula, A means ethyleneoxy, B means propyleneoxy and D means butyleneoxy. In a preferred embodiment, butyleneoxy is 1,2-butyleneoxy to an extent of 80% or more.

In the above-defined general formula l, m and n are each integers. It is, however, clear to the person skilled in the art in the field of polyalkoxylates that this definition is the definition of a single surfactant in each case. In the case of presence of surfactant mixtures or surfactant formulations which comprise a plurality of surfactants of the general formula, the numbers l and m are each mean values over all molecules of the surfactants, since the alkoxylation of alcohol with ethylene oxide and/or propylene oxide in each case affords a certain distribution of chain lengths. This distribution can be described in a manner known in principle by the polydispersity D. $D=M_w/M_n$ is the quotient of the weight-average molar mass and the number-average molar mass. The polydispersity can be determined by means of the methods known to those skilled in the art, for example by means of gel permeation chromatography.

In the above general formula l is from 0 to 99, preferably 1 to 40, more preferably 1 to 20.

In the above general formula m is from 0 to 99, preferably 1 to 20, more preferably 4 to 15.

In the above general formula n is from 0 to 99, preferably 1 to 20, more preferably 2 to 15.

According to the invention, the sum of l+m+n is a number in the range from 3 to 99, preferably in the range from 5 to 50, more preferably in the range from 8 to 39.

The ethyleneoxy (A), propyleneoxy (B) and butyleneoxy (D) block(s) are randomly distributed, alternatingly distributed, or are in the form of two, three, four, five or more blocks in any sequence.

In a preferred embodiment of the invention, in the presence of a plurality of different alkyleneoxy blocks, the sequence $(R^1)(R^2)$—CH—CH$_2$, butyleneoxy block, propyleneoxy block, ethyleneoxy block is preferred.

In the above general formula, X is an alkylene group or alkenylene group having 0 to 10, preferably 0 to 3 carbon atoms. The alkylene group is preferably a methylene, ethylene or propylene group.

In the above general formula Y is a sulfonate, sulfate or carboxyl group or phosphate group, (preferably sulfonate, sulfate or carboxyl group). Thus, a may be 1 or 2.

In the above formula $M^+$ is a cation, preferably a cation selected from the group of Na$^+$, K$^+$, Li$^+$, NH$_4^+$, H$^+$, Mg$^{2+}$ and Ca$^{2+}$ (preferably Na$^+$, K$^+$ or NH$_4^+$). Overall, b may have values of 1, 2 or 3.

The alcohols $(R^1)(R^2)$—CH—CH$_2$—OH which serve as the starting compound for preparation of the inventive surfactants can be prepared by the dimerization of alcohols of the $R^1CH_2CH_2OH$ and $R^2OH$ type with elimination of water.

Accordingly, a process for preparing surfactants of the general formula $(R^1)(R^2)$—CH—CH$_2$—O-(D)$_n$-(B)$_m$-(A)$_l$-XY$^{a-}$ a/b M$^{b+}$ (1) is provided, in which $R^1$, $R^2$, D, B, A, X, Y$^-$, M$^+$, n, m and l are each as defined above, comprising the steps of:
(a) preparing Guerbet alcohols of the general formula (IV) $(R^1)(R^2)$—CH—CH$_2$OH (IV) where $R^1$ and $R^2$ are each as defined above by condensing a mixture of at least two primary alcohols of the formula R—CH$_2$—OH where R is a linear or branched, saturated or unsaturated, aliphatic hydrocarbyl radical having 15 to 17 carbon atoms,
(b) alkoxylating the alcohols obtained in process step (a),
(c) optionally introducing the spacer group X, and
(d) adding the Y group onto the compounds obtained in process step (b) or (c), preferably sulfation of the compounds obtained in process step (b) or (c).

The preparation of the Guerbet alcohol of the general formula (IV) $(R^1)(R^2)$—CH—CH$_2$OH in process step (a) is known to those skilled in the art.

In the course of the Guerbet reaction, primary alcohols are ultimately dimerized to β-branched primary alcohols in the presence of suitable catalysts. The primary products formed from the alcohol are aldehydes, which subsequently dimerize by aldol condensation with elimination of water and subsequent hydrogenation to give saturated alcohols. In addition to the main product, the Guerbet alcohol, it is also possible for different by-products to form, for example unsaturated β-branched primary alcohols if the hydrogenation of the double bond is incomplete, saturated α-branched aldehydes if the hydrogenation to the Guerbet alcohol was incomplete, or especially β-branched primary alcohols which have additional branches in the side chain or main chain.

The dimerization of the alcohols of the formula R—CH$_2$—OH may involve a mixture of alcohols. These mixtures may include a C16C18-fatty alcohol mixture (linear, saturated), a C16C18 mixture of Ziegler alcohols having 16 or 18 carbon atoms, a C16C18 fatty alcohol mixture (linear and partly unsaturated), a mixture of C16C17 oxoalcohol (e.g. Neodol 67 from Shell), a mixture of C16C18 fatty alcohol with iC17 alcohol from BASF.

The dimerization of the alcohols of the formula R—CH$_2$—OH where R is a linear or branched, saturated or unsaturated, aliphatic hydrocarbyl radical having 15 or 17 carbon atoms gives, in a preferred embodiment of the invention, Guerbet alcohols having 32, 34 and 36 carbon atoms.

In a particularly preferred embodiment, R is a linear saturated or unsaturated (preferably saturated) aliphatic hydrocarbyl radical having 15 or 17 carbon atoms.

To prepare the Guerbet alcohols in process step (a), mixtures of the alcohols (II) are condensed. The proportion of alcohols where R=15 is preferably between 25-50 mol %, and the proportion of alcohols where R=17 is between 50-75 mol %. Particular preference is given to converting about 30 mol % of alcohols where R=15 and 70 mol % of alcohols where R=17.

The condensation of alcohols (II) to Guerbet alcohols is performed in the presence of 0.5 to 10% by weight, based on the alcohol, of alkali metal or alkaline earth metal hydroxide, for example lithium hydroxide, sodium hydroxide, cesium hydroxide or potassium hydroxide, preferably potassium hydroxide. With regard to a high reaction rate and a small proportion of secondary components, the alkali metal or alkaline earth metal hydroxide can be used in a concentration of 3 to 6% by weight based on the alcohol. The alkali metal or alkaline earth metal hydroxide can be used in solid form (flakes, powder) or in the form of a 30 to 70%, preferably 50%, aqueous solution.

In a preferred embodiment, the alcohols of the formula (II) are condensed in the presence of NaOH and/or KOH.

Suitable catalyst(s) are the catalysts known from the prior art, as used, for example, in U.S. Pat. No. 3,119,880 (nickel, lead salts), in U.S. Pat. No. 3,558,716 (copper, lead, zinc, chromium, molybdenum, tungsten and manganese oxides), in U.S. Pat. No. 3,979,466 (palladium complexes) or else in U.S. Pat. No. 3,864,407 (silver complexes). Preference is given to using ZnO as the catalyst for the dimerization.

The catalyst or catalysts preferably are ZnO catalysts which are generally used added to the mixture from which the Guerbet alcohols are prepared.

The mixture of Guerbet alcohols can be prepared by then known processes described in DE 3901095 A1.

In a preferred embodiment of the invention, the Guerbet alcohols are synthesized in process step (a) at a temperature in the range from 150 to 320° C., preferably at a temperature in the range from 200 to 280° C., optionally in the presence of a catalyst or catalysts.

The surfactants of the general formula can be prepared in a manner known in principle by alkoxylating corresponding alcohols $(R^1)(R^2)$—CH—CH$_2$—OH in process step (b). The performance of such alkoxylation is known in principle to those skilled in the art. It is likewise known to those skilled in the art that the molecular mass distribution of the alkoxylates can be influenced through the reaction conditions, especially the selection of the catalyst.

The surfactants of the general formula can preferably be prepared in process step (b) by base-catalyzed alkoxylation. In this case, the alcohol $(R^1)(R^2)$—CH—CH$_2$—OH can be admixed in a pressure reactor with alkali metal hydroxides, preferably potassium hydroxide, or with alkali metal alkoxides, for example sodium methoxide. Water still present in the mixture can be drawn off by means of reduced pressure (for example <100 mbar) and/or increasing the temperature (30 to 150° C.). Thereafter, the alcohol is present in the form of the corresponding alkoxide. This is followed by intertization with inert gas (for example nitrogen) and stepwise addition of the alkylene oxide(s) at temperatures of 60 to 180° C. up to a maximum pressure of 10 bar. In a preferred embodiment, the alkylene oxide is metered in initially at 130° C. In the course of the reaction, the temperature rises up to 170° C. as a result of the heat of reaction released. In a further preferred embodiment of the invention, the butylene oxide is first added at a temperature in the range from 135 to 145° C., then the propylene oxide is added at a temperature in the range from 130 to 145° C., and then the ethylene oxide is added at a temperature in the range from 125 to 145° C. At the end of the reaction, the catalyst can be centralized, for example, by adding acid (for example acetic acid or phosphoric acid) and filtered off if required.

However, the alkoxylation of the alcohols $(R^1)(R^2)$—CH—CH$_2$—OH can also be undertaken by means of other methods, for example by acid-catalyzed alkoxylation. In addition, it is possible to use, for example double hydroxide clays, as described in DE 4325237 A1, or it is possible to use double metal cyanide catalysts (DMC catalysts). Suitable DMC catalysts are disclosed, for example in DE 10243361 A1, especially in paragraphs [0029] to [0041] and the literature cited therein. For example, it is possible to use catalysts of the Zn—Co type. To perform the reaction, the alcohol $(R^1)(R^2)$—CH—CH$_2$—OH can be admixed with the catalyst, and the mixture can be dewatered as described above and reacted with the alkylene oxides as described. Typically not more than 1000 ppm of catalyst based on the mixture are used, and the catalyst can remain in the product owing to this small amount. The amount of catalyst may generally be less than 1000 ppm, for example 250 ppm or less.

Process step (c) relates to the introduction of the spacer group X, when it is not a single bond. This is followed, as process step (d), by the introduction of the anionic group. Steps (c) and (d) are preferably effected simultaneously, such that they can be combined in one step.

The anionic group is finally introduced in process step (d). This is known in principle to those skilled in the art. In principle, the anionic group $XY^{a-}$ is composed of the functional group $Y^{a-}$, which is a sulfate, sulfonate, carboxylate or phosphate group, and the spacer X, which in the simplest case may be a single bond ("alkyl or alkylene group having 0 carbon atoms"). In the case of a sulfate group, it is possible, for example, to employ the reaction with sulfuric acid, chlorosulfonic acid or sulfur trioxide in a falling-film reactor with subsequent neutralization. In the case of a sulfonate group it is possible, for example, to employ the reaction with propane sultone and subsequent neutralization, with butane sultone and subsequent neutralization, with vinylsulfonic acid sodium salt, or with 3-chloro-2-hydroxypropanesulfonic acid sodium salt. To prepare sulfonates, the terminal OH group can also be converted to a chloride, for example with phosgene or thionyl chloride, and then, for example, reacted with sulfite. In the case of a carboxylate group, it is possible, for example, to employ the oxidation of the alcohol with oxygen and subsequent neutralization, or the reaction with chloroacetic acid sodium salt. Carboxylates can, for example, also be obtained by Michael addition of (meth)acrylic acid or ester. Phosphates can, for example, be obtained by esterification reaction with phosphoric acid or phosphorus pentachloride.

Further Surfactants

In addition to the surfactants of the general formula (I), (II) and (III), the formulation may additionally optionally comprise further surfactants. These are, for example, anionic surfactants of the alkylarylsulfonate or olefinsulfonate (alpha-olefinsulfonate or internal olefinsulfonate) type and/or nonionic surfactants of the alkyl ethoxylate or alkyl polyglucoside type. Betaine surfactants may also be used. These further surfactants may especially also be oligomeric or polymeric surfactants. It is advantageous to use such polymeric co-surfactants to reduce the amount of surfactants needed to form a microemulsion. Such polymeric co-surfactants are therefore also referred to as "microemulsion boosters". Examples of such polymeric surfactants comprise amphiphilic block copolymers which comprise at least one hydrophilic block and at least one hydrophobic block. Examples comprise polypropylene oxide-polyethylene oxide block copolymers, polyisobutene-polyethylene oxide block copolymers, and comb polymers with polyethylene oxide side chains and a hydrophobic main chain, where the main chain preferably comprises essentially olefins or (meth)acrylates as monomers. The term "polyethylene oxide" here should in each case include polyethylene oxide blocks comprising propylene oxide units as defined above. Further details of such surfactants are disclosed in WO 2006/131541 A1.

Process for Mineral Oil Production

In the process according to the invention for mineral oil production, a suitable aqueous formulation of the surfactants of the general formula is injected through at least one injection borehole into the mineral oil deposit, and crude oil is withdrawn from the deposit through at least one production borehole. The term "crude oil" in this context of course does not mean single-phase oil, but rather the usual crude oil-water emulsions. In general, a deposit is provided with several injection boreholes and with several production boreholes.

The main effect of the surfactant lies in the reduction of the interfacial tension between water and oil—desirably to values significantly <0.1 mN/m. After the injection of the surfactant formulation, known as "surfactant flooding", or preferably the Winsor type III "microemulsion flooding", the pressure can be maintained by injecting water into the formation ("water flooding") or preferably a higher-viscosity aqueous solution of a polymer with strong thickening action ("polymer flooding"). Also known, however, are techniques by which the surfactants are first of all allowed to act on the formation. A further known technique is the injection of a solution of surfactants and thickening polymers, followed by a solution of thickening polymer. The person skilled in the art is aware of details of the industrial performance of "surfactant flooding", "water flooding", and "polymer flooding", and employs an appropriate technique according to the type of deposit.

For the process according to the invention, an aqueous formulation which comprises surfactants of the general formula is used. In addition to water, the formulations may optionally also comprise water-miscible or at least water-dispersible organic substances or other substances. Such additives serve especially to stabilize the surfactant solution during storage or transport to the oil field. The amount of such additional solvents should, however, generally not exceed 50% by weight, preferably 20% by weight. In a particularly advantageous embodiment of the invention, exclusively water is used for formulation. Examples of water-miscible solvents include especially alcohols such as methanol, ethanol and propanol, butanol, sec-butanol, pentanol, butyl ethylene glycol, butyl diethylene glycol or butyl triethylene glycol.

In a preferred embodiment of the invention, the three different surfactants of the general formula (I) with regard to the alkyl moiety $(R^1)(R^2)$—CH—CH$_2$— should make up the main component among all surfactants in the formulation which is ultimately injected into the deposit. This is preferably at least 25% by weight, more preferably at least 30% by weight, even more preferably at least 40% by weight and more preferably still at least 50% by weight of all surfactants used.

The mixture used in accordance with the invention can preferably be used for surfactant flooding of deposits. It is especially suitable for Winsor type III microemulsion flooding (flooding in the Winsor III range or in the range of existence of the bicontinuous microemulsion phase). The technique of microemulsion flooding has already been described in detail at the outset.

In addition to the surfactants, the formulations may also comprise further components, for example $C_4$- to $C_8$ alcohols and/or basic salts (so-called "alkali surfactant flooding"). Such additives can be used, for example, to reduce retention in the formation. The ratio of the alcohols based on the total amount of surfactant used is generally at least 1:1—however, it is also possible to use a significant excess of alcohol. The amount of basic salts may typically range from 0.1% by weight to 5% by weight.

The deposits in which the process is employed generally have a temperature of at least 10° C., for example 10 to 150° C., preferably a temperature of at least 15° C. to 120° C. The total concentration of all surfactants together is 0.05 to 5% by weight, based on the total amount of the aqueous surfactant formulation, preferably 0.1 to 2.5% by weight. The person skilled in the art makes a suitable selection according to the desired properties, especially according to the conditions in the mineral oil formation. It is clear here to the person skilled in the art that the concentration of the surfactants can change after injection into the formation because the formulation can mix with formation water, or surfactants can also be absorbed on solid surfaces of the formation. It is the great advantage of the mixture used in accordance with the invention that the surfactants lead to a particularly good lowering of interfacial tension.

It is of course possible and also advisable first to prepare a concentrate which is only diluted on site to the desired concentration for injection into the formation. In general, the total concentration of the surfactants in such a concentrate is 10 to 45% by weight.

The examples which follow are intended to illustrate the invention in detail:
Part I: Synthesis of the Surfactants
General Method 1: Preparation of the Guerbet Alcohol In a 1 l flask, the alcohol(s) (1 eq.) is/are initially charged and if appropriate melted at 50° C. KOH powder (0.24 eq.) and zinc oxide (5% by weight based on the starter alcohol) are added while stirring. The reaction mixture is heated as rapidly as possible to 200-230° C., and the water of reaction which forms is distilled off via a distillation outlet. For the fastest possible removal of the water of reaction, the glass flask is optionally insulated with aluminum foil. The reaction mixture is stirred at the given temperature for a further 6 to 30 hours. The alcohol mixture formed is analyzed by gas chromatography and used without further workup for the subsequent alkoxylation.

General Method 2: Alkoxylation by Means of KOH Catalysis (Relevant Use of EO, PO and/or 1,2-BuO)

In a 2 l autoclave, the alcohol to be alkoxylated (1.0 eq) is optionally admixed with an aqueous KOH solution which comprises 50% by weight of KOH. The amount of KOH is 0.2% by weight of the product to be prepared. While stirring, the mixture is dewatered at 100° C. and 20 mbar for 2 h. This is followed by purging three times with $N_2$, establishment of a feed pressure of approx. 1.3 bar of $N_2$ and a temperature increase to 120 to 130° C. The alkylene oxide is metered in such that the temperature remains between 125° C. and 135° C. (in the case of ethylene oxide) or 130 and 140° C. (in the case of propylene oxide) or 135 and 145° C. (in the case of 1,2-butylene oxide). This is followed by stirring at 125 to 145° C. for a further 5 h, purging with $N_2$, cooling to 70° C. and emptying of the reactor. The basic crude product is neutralized with the aid of acetic acid. Alternatively, the neutralization can also be effected with commercial magnesium silicates, which are subsequently filtered off. The light-colored product is characterized with the aid of a $^1$H NMR spectrum in $CDCl_3$, gel permeation chromatography and OH number determination, and the yield is determined.

General Method 3: Alkoxylation by Means of DMC Catalysis

In a 2 l autoclave, the alcohol to be alkoxylated (1.0 eq) is mixed with a double metal cyanide catalyst (for example DMC catalyst of the Zn—Co type from BASF) at 80° C. To activate the catalyst, approximately 20 mbar is applied at 80° C. for 1 h. The amount of DMC is 0.1% by weight or less of the product to be prepared. This is followed by purging three times with $N_2$, establishment of a feed pressure of approx. 1.3 bar of $N_2$ and a temperature increase to 120 to 130° C. The alkylene oxide is metered in such that the temperature remains between 125° C. and 135° C. (in the case of ethylene oxide) or 130 and 140° C. (in the case of propylene oxide) or 135 and 145° C. (in the case of 1,2-butylene oxide). This is followed by stirring at 125 to 145° C. for a further 5 h, purging with $N_2$, cooling to 70° C. and emptying of the reactor. The light-colored product is characterized with the aid of a $^1$H NMR spectrum in $CDCl_3$, gel permeation chromatography and OH number determination, and the yield is determined.

General Method 4: Sulfation by Means of Chlorosulfonic Acid

In a 1 l round-bottom flask, the alkyl alkoxylate to be sulfated (1.0 eq) is dissolved in 1.5-times the amount of dichloromethane (based on percent by weight) and cooled to 5 to 10° C. Thereafter, chlorosulfonic acid (1.1 eq) is added dropwise such that the temperature does not exceed 10° C. The mixture is allowed to warm up to room temperature and is stirred under an $N_2$ stream at this temperature for 4 h before the above reaction mixture is added dropwise to an aqueous NaOH solution of half the volume at max. 15° C. The amount of NaOH is calculated to give rise to a slight excess based on the chlorosulfonic acid used. The resulting pH is approx. pH 9 to 10. The dichloromethane is removed at max. 50° C. on a rotary evaporator under gentle vacuum.

The product is characterized by $^1$H NMR and the water content of the solution is determined (approx. 70%).

For the synthesis, the following alcohols were used.

| Alcohol | Description |
|---|---|
| C16C18 | Commercially available fatty alcohol mixture consisting of linear $C_{16}H_{33}$—OH and $C_{18}H_{37}$—OH |
| $C_{32}$ Guerbet | Commercially available $C_{32}$ Guerbet alcohol (2-tetradecyloctadecan-1-ol), purity > 98% |
| C16 | Commercially available fatty alcohol consisting of linear $C_{16}H_{33}$—OH |
| $C_{36}$ Guerbet (80%) | $C_{36}$ Guerbet alcohol (2-hexadecyleicosan-1-ol), purity 80% |

Performance Tests

The surfactants obtained were used to carry out the following tests in order to assess the suitability thereof for tertiary mineral oil production.

Description of the Test Methods

Determination of SP* a) Principle of the Measurement:

The interfacial tension between water and oil was determined in a known manner via the measurement of the solubilization parameter SP*. The determination of the interfacial tension via the determination of the solubilization parameter SP* is a method for approximate determination of the interfacial tension which is accepted in the technical field. The solubilization parameter SP* indicates how many ml of oil are dissolved per ml of surfactant used in a microemulsion (Winsor type III). The interfacial tension σ (IFT) can be calculated therefrom via the approximate formula IFT≈0.3/(SP*)$^2$, if equal volumes of water and oil are used (C. Huh, J. Coll, Interf. Sc., Vol. 71, No. 2 (1979)).

b) Procedure

To determine the SP*, a 100 ml measuring cylinder with a magnetic stirrer bar is filled with 20 ml of oil and 20 ml of water. To this are added the concentrations of the particular surfactants. Subsequently, the temperature is increased stepwise from 20 to 90° C., and the temperature window in which a microemulsion forms is observed.

The formation of the microemulsion can be assessed visually or else with the aid of conductivity measurements. A triphasic system forms (upper oil phase, middle microemulsion phase, lower water phase). When the upper and lower phase are of equal size and do not change over a period of 12 h, the optimal temperature ($T_{opt}$) of the microemulsion has been found. The volume of the middle phase is determined. The volume of surfactant added is subtracted from this volume. The value obtained is then divided by two. This volume is then divided by the volume of surfactant added. The result is noted as SP*.

The type of oil and water used to determine SP* is determined according to the system to be examined. It is possible either to use mineral oil itself or a model oil, for example decane. The water used may either be pure water or saline water, in order better to model the conditions in the mineral oil formation. The composition of the aqueous phase can be adjusted, for example, according to the composition of a particular deposit water.

Information regarding the aqueous phase used and the oil phase can be found below in the specific description of the tests.

Test Results

A 1:1 mixture of decane and of an NaCl solution was admixed with butyl diethylene glycol (BDG). Butyl diethylene glycol (BDG) functions as a co-solvent and is not included in the calculation of SP*. To this was added a surfactant mixture composed of 3 parts alkyl alkoxysulfate and 1 part dodecylbenzene sulfonate (Lutensit A-LBN 50 ex BASF). The total surfactant concentration is reported in percent by weight of the total volume.

The results are shown in table 1.

TABLE 1

Tests with decane

| Ex. | Alkyl - AO - $SO_4Na$: $C_{12}H_{25}Ph$—$SO_3Na$ = 3:1 | Surfactant [%] | BDG [%] | NaCl [%] | $T_{opt}$ [° C.] | SP* | IFT [mN/m] |
|---|---|---|---|---|---|---|---|
| C1 | C16C18-9PO-sulfate | 1.25 | 2 | 4 | 67.6 | 13 | 0.0018 |
| C2 | C32 Guerbet (80%) - 7 PO-10 EO-sulfate | 0.4 | 2 | 5.07 | 71 | 18.25 | 0.0009 |
| C3 | C32 Guerbet (90%) - 7 PO-10 EO-sulfate | 0.4 | 2 | 5 | 72 | 26.8 | 0.0004 |
| C4 | C36 Guerbet (80%) - 7 PO-10 EO-sulfate | 0.8 | 2 | 5.85 | 71 | 7.3 | 0.0056 |
| 5 | C32C34C36 Guerbet (80%) - 7 BuO - 7 PO - sulfate | 0.4 | 2 | 2.5 | 59 | 27.6 | 0.0004 |
| 6 | C32C34C36 Guerbet (80%) - 7 BuO - 7 PO - sulfate | 0.4 | 2 | 2 | 73.5 | 29.7 | 0.0003 |
| C7 | C36 Guerbet (80%) - 7 BuO - 7 PO - sulfate | 0.4 | 2 | 2 | 70 | 27.6 | 0.0004 |
| C8 | C36 Guerbet (80%) 7 - BuO - 7 PO - sulfate | 0.2 | 2 | 2 | 69 | 29 | 0.0004 |
| 9 | C32C34C36 Guerbet (80%) - 7 BuO - 7 PO - sulfate | 0.2 | 2 | 1.9 | 70 | 37 | 0.0002 |

As can be seen in Table 1 in comparative example C1, a standard system based on C16C18-9 PO-sulfate gives an interfacial tension of 0.0018 mN/m on decane. The advantage of this system is the good availability of the surfactant, since the parent C16C18 fatty alcohol is available in a large amount (approx. 200 000 to/y). It is known from the specialist literature (e.g. T. Sottmann, R. Strey "Microemulsions", *Fundamentals of Interface and Colloid Science* 2005, Volume V, chapter 5) that the interfacial tension rises with the chain length of the oil used. In order to obtain low interfacial tensions on heavy oils, a surfactant with a relatively long hydrophobic moiety is therefore needed. Remaining with the model oil decane, surfactant systems with interfacial tensions of <0.001 mN/m are consequently of great interest.

The structure of such surfactants requires alcohols which should have 30 or more carbon atoms. Linear or lightly branched alcohols in this carbon chain range (e.g. Ziegler alcohols by ethylene oligomerization and subsequent introduction of the alcohol group) are available only in extremely small amounts and are not an option for tertiary mineral oil production.

The only alcohols known to date on the market are long-chain Guerbet alcohols. These are prepared by dimerizing alcohols with elimination of water, and are primary alcohols with a branch in the 2 position. However, the longer the alcohol used, the more difficult this dimerization is, i.e. the conversion rates are incomplete (in the case of Guerbet alcohols having more than 28 carbon atoms they are usually only 70%). Therefore, long-chain Guerbet alcohols had good industrial availability only as a mixture of the Guerbet alcohol and the low molecular weight alcohol which was used as the starting material. A C32 Guerbet (80%) is therefore a mixture of 80% C32 Guerbet alcohol and 20% C16 alcohol. As can be seen with reference to comparative examples C2, C3 and C4, the interfacial tension is significantly below $10^{-3}$ mN/m if very pure Guerbet alcohols (>>80%) can be prepared and used.

If, however, pure Guerbet alcohols which have more than 30 carbon atoms are desired, this requires distillation to remove the low molecular alcohol. This complicates the production and makes it more expensive.

The insertion of butylenes oxide helps to further reduce the interfacial tension. This can be seen from comparative examples C7 and C8.

Surprisingly, a mixture of Guerbet alcohols which is obtained by use of C16C18 fatty alcohol however leads to better high-performance surfactants, as can be seen in example 5, 6 and 9.

To afford fair comparison the formulations as well as optimal salinity and temperature should be similar. Following this directive it can be seen by comparison of example 6 and comparative example 7 that the interfacial tension is again lower in case the claimed tensides based on a Guerbet alcohol mixture are used. Reduction of the tenside concentration to 0.2% and remaining of a concentration of 2% BDG typically results in difficulties to obtain or maintain a low interfacial tension. Surprisingly it can be seen that the claimed tenside of example 9 shows a further reduced interfacial tension of $2 \cdot 10^{-4}$ mN/m, whereas in comparative example 8 the interfacial tension under almost identical conditions is $4 \cdot 10^{-4}$ mN/m.

The invention claimed is:

1. A surfactant mixture comprising at least three ionic surfactants of the general formula (I) each of which are different with regard to the alkyl moiety $(R^1)(R^2)$—CH—CH$_2$—, wherein the at least 3 ionic surfactants individually include an alkyl radical with 32 carbon atoms, 34 carbon atoms and 36 carbon atoms,

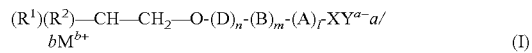

where
$R^1$ is a linear or branched, saturated or unsaturated, aliphatic hydrocarbyl radical having 14 to 16 carbon atoms,
$R^2$ is a linear or branched, saturated or unsaturated, aliphatic hydrocarbyl radical having 16 to 18 carbon atoms,
A is ethyleneoxy,
B is propyleneoxy,
D is butyleneoxy,
l is from 0 to 99,
m is from 0 to 99,
n is from 2 to 15,
X is an alkyl or alkylene group having 0 to 10 carbon atoms,
$M^{b+}$ is a cation,
$Y^{a-}$ is selected from the group of sulfate groups, sulfonate groups, carboxylate groups and phosphate groups,
b is 1, 2 or 3, and
a is 1 or 2,
where the A and B groups may be distributed randomly, alternatingly, or in the form of two, three, four or more blocks in any sequence and the sum of l+m+n is in the range from 0 to 99.

2. The surfactant mixture according to claim 1, wherein the sum of l+m+n is within the range from 4 to 50.

3. The surfactant mixture according to claim 1, wherein
m is from 4 to 15,
n is from 2 to 15, and
$Y^-$ is selected from the group of sulfate groups, sulfonate groups and carboxylate groups, where
the A and B groups are present to an extent of more than 80% in block form in the sequence D, B, A beginning from $(R^1)(R^2)$—CH—CH$_2$, the sum of l+m is in the range from 4 to 50.

4. The surfactant mixture according to claim 1, wherein
m is from 5 to 9,
n is from 2 to 15, and
$Y^-$ is selected from the group of sulfate groups, sulfonate groups, and carboxylate groups, where
the A, B and D groups are present to an extent of more than 80% in block form in the sequence D, B, A beginning from $(R^1)(R^2)$—CH—CH$_2$, the sum of l+m+n is in the range from 7 to 50, and the block D consists to an extent of 80% and more of 1,2-butylene oxide.

5. The surfactant mixture according to claim 1, wherein the three different surfactants of the general formula (I) with regard to the alkyl moiety $(R^1)(R^2)$—CH—CH$_2$— are present in a mixture with surfactants of the formula $(R^1)$—CH$_2$—CH$_2$—O-(D)$_n$-(B)$_m$-(A)$_l$-XY$^{a-}$a/bM$^{b+}$(II) and surfactants of the formula $(R^2)$—O-(D)$_n$-(B)$_m$-(A)$_l$-XY$^{a-}$a/bM$^{b+}$ (III),
where $R^1$, $R^2$, A, B, D, X, $M^+$, m, n and l are each as defined above, and the surfactants of the formula (I) make up between 80 and 99% by weight of the amount of compounds of the formulae (I), (II) and (III).

6. The surfactant mixture according to claim 1, wherein the three different surfactants of the general formula (I) with regard to the alkyl moiety $(R^1)(R^2)$—CH—CH$_2$— are present in a mixture with surfactants of the formula $(R^1)$—

$CH_2-CH_2-O-(D)_n-(B)_m-(A)_l-XY^{a-}a/bM^{b+}$ (II) and surfactants of the formula $(R^2)-O-(D)_n-(B)_m-(A)_l-XY^{a-}a/bM^{b+}$ (III), where $R^1$, $R^2$, A, B, D, X, $Y^-$, $M^+$, m, n and l are each as defined above, and the surfactants of the formula (I) make up between 85 and 99% by weight of the amount of compounds of the formulae (I), (II) and (III).

7. A process for preparing a surfactant mixture as defined in claim 1, comprising the steps of:
   (a) preparing Guerbet alcohols of the general formula (IV) $(R^1)(R^2)-CH-CH_2OH$ (IV) where $R^1$ and $R^2$ are each as defined above by condensing a mixture of at least two primary alcohols of the formula $R-CH_2-OH$ where R is a linear or branched, saturated or unsaturated, aliphatic hydrocarbyl radical having 15 to 17 carbon atoms,
   (b) alkoxylating the alcohols obtained in process step (a),
   (c) optionally introducing the spacer group X, and
   (d) adding the Y group onto the compounds obtained in process step (b) or (c).

8. A surfactant mixture comprising at least three ionic surfactants which are different with regard to the alkyl moiety $(R^1)(R^2)-CH-CH_2-$ and are of the general formula (I)

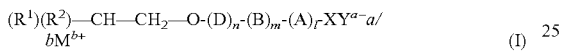

(I)

where
$R^1$ is a linear or branched, saturated or unsaturated, aliphatic hydrocarbyl radical having 14 to 16 carbon atoms,
$R^2$ is a linear or branched, saturated or unsaturated, aliphatic hydrocarbyl radical having 16 to 18 carbon atoms,
A is ethyleneoxy,
B is propyleneoxy,
D is butyleneoxy,
l is from 0 to 99,
m is from 0 to 99,
n is from 0 to 99,
X is an alkyl or alkylene group having 0 to 10 carbon atoms,
$M^{b+}$ is a cation,
$Y^{a-}$ is selected from the group of sulfate groups, sulfonate groups, carboxylate groups and phosphate groups,
b is 1, 2 or 3, and
a is 1 or 2,
where the A and B groups may be distributed randomly, alternatingly, or in the form of two, three, four or more blocks in any sequence and the sum of l+m+n is in the range from 0 to 99, and
wherein the three different surfactants of the general formula (I) with regard to the alkyl moiety $(R^1)(R^2)-CH-CH_2-$ are present in a mixture with surfactants of the formula $(R^1)-CH_2-CH_2-O-(D)_n-(B)_m-(A)_l-XY^{a-}a/bM^{b+}$ (II) and surfactants of the formula $(R^2)-O-(D)_n-(B)_m-(A)_l-XY^{a-}a/bM^{b+}$ (III),
where $R^1$, $R^2$, A, B, D, X, $Y^-$, $M^+$, m, n and l are each as defined above, and the surfactants of the formula (I) make up between 80 and 99% by weight of the amount of compounds of the formulae (I), (II) and (III).

9. A surfactant mixture comprising at least three ionic surfactants which are different with regard to the alkyl moiety $(R^1)(R^2)-CH-CH_2-$ and are of the general formula (I)

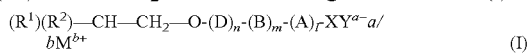

(I)

where
$R^1$ is a linear or branched, saturated or unsaturated, aliphatic hydrocarbyl radical having 14 to 16 carbon atoms,
$R^2$ is a linear or branched, saturated or unsaturated, aliphatic hydrocarbyl radical having 16 to 18 carbon atoms,
A is ethyleneoxy,
B is propyleneoxy,
D is butyleneoxy,
l is from 0 to 99,
m is from 0 to 99,
n is from 0 to 99,
X is an alkyl or alkylene group having 0 to 10 carbon atoms,
$M^{b+}$ is a cation,
$Y^{a-}$ is selected from the group of sulfate groups, sulfonate groups, carboxylate groups and phosphate groups,
b is 1, 2 or 3, and
a is 1 or 2,
where the A and B groups may be distributed randomly, alternatingly, or in the form of two, three, four or more blocks in any sequence and the sum of l+m—+n is in the range from 0 to 99, and
wherein the three different surfactants of the general formula (I) with regard to the alkyl moiety $(R^1)(R^2)-CH-CH_2-$ are present in a mixture with surfactants of the formula $(R^1)-CH_2-CH_2-O-(D)_n-(B)_m-(A)_l-XY^{a-}a/bM^{b+}$ (II) and surfactants of the formula $(R^2)-O-(D)_n-(B)_m-(A)_l-XY^{a-}a/bM^{b+}$ (III),
where $R^1$, $R^2$, A, B, D, X, $Y^-$, $M^+$, m, n and l are each as defined above, and the surfactants of the formula (I) make up between 85 and 99% by weight of the amount of compounds of the formulae (I), (II) and (III).

10. The surfactant mixture according to claim 1, wherein the surfactant with the alkyl radical with 32 carbon atoms has $R^1/R^2$ of 14/16, the alkyl radical with 34 carbon atoms has $R^1/R^2$ of 14/18 or 16/16, and the alkyl radical with 36 carbon atoms has $R^1/R^2$ of 16/18.

11. The surfactant mixture according to claim 1, wherein $R^1$ and $R^2$ are linear saturated alkyl radicals.

12. The surfactant mixture according to claim 1, wherein the at least three ionic surfactants of the general formula (I) account for at least at least 40% by weight, based on the total weight of the surfactant mixture.

13. The surfactant mixture according to claim 10, wherein the at least three ionic surfactants of the general formula (I) account for at least at least 40% by weight, based on the total weight of the surfactant mixture.

* * * * *